Figure 1:
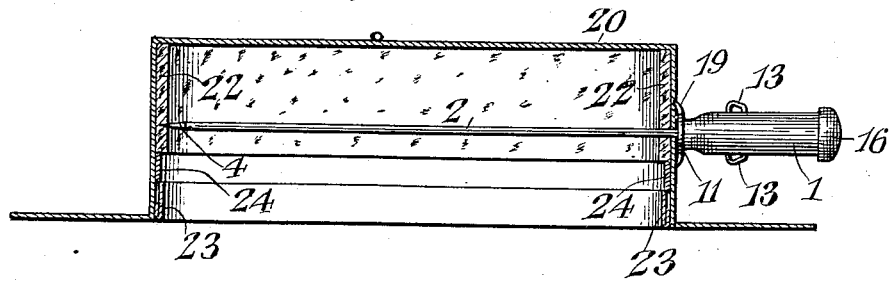

A. B. KOKERNOT.
HAT PIN.
APPLICATION FILED SEPT. 30, 1911.

1,070,264.

Patented Aug. 12, 1913.

3 SHEETS—SHEET 1.

Alexander B. Kokernot, Inventor

Witnesses

By

Attorney

A. B. KOKERNOT.
HAT PIN.
APPLICATION FILED SEPT. 30, 1911.

1,070,264.

Patented Aug. 12, 1913.
3 SHEETS—SHEET 2.

Alexander B. Kokernot, Inventor

Witnesses
Jas. K. McCathran
F. T. Chapman

By
C. G. Siggers
Attorney

A. B. KOKERNOT.
HAT PIN.
APPLICATION FILED SEPT. 30, 1911.
1,070,264.
Patented Aug. 12, 1913.
3 SHEETS—SHEET 3.
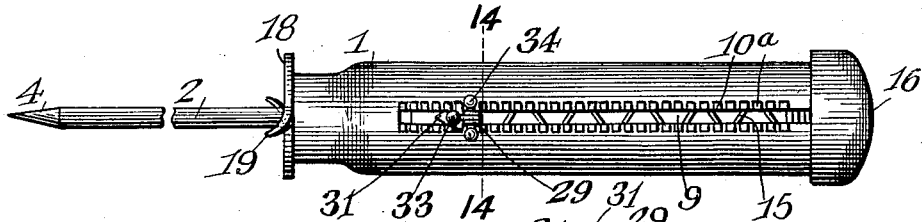
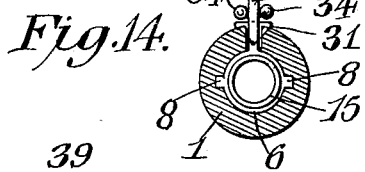
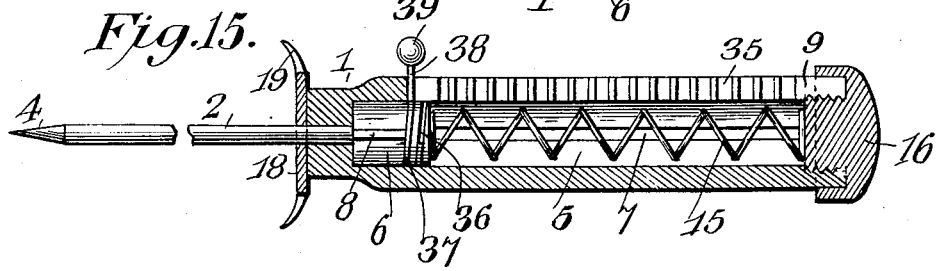
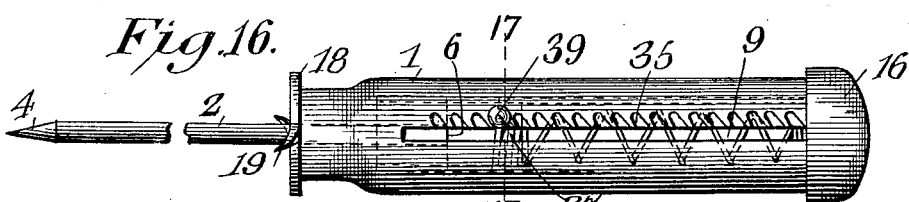
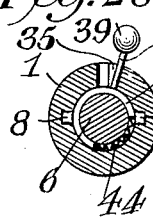
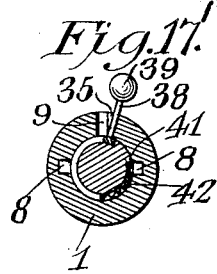
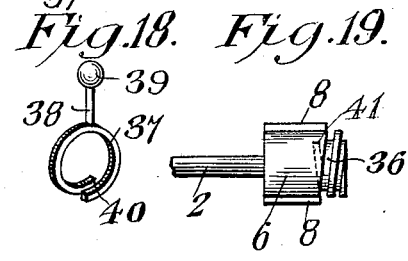
Witnesses
Jas. W. McCathran
F. T. Chapman.
Alexander B. Kokernot, Inventor
By _____ Attorney

UNITED STATES PATENT OFFICE.

ALEXANDER B. KOKERNOT, OF NEW ORLEANS, LOUISIANA.

HAT-PIN.

1,070,264.  Specification of Letters Patent.  Patented Aug. 12, 1913.

Application filed September 30, 1911. Serial No. 652,132.

*To all whom it may concern:*

Be it known that I, ALEXANDER B. KOKERNOT, a citizen of the United States, residing at New Orleans, in the parish of Orleans and State of Louisiana, have invented a new and useful Hat-Pin, of which the following is a specification.

This invention has reference to improvements in hat pins, and its object is to provide a hat pin which may be securely fastened to a hat with the point interior to the body of the hat or projecting therethrough for a short distance at the will of the operator. To this end the hat pin comprises a head member and a shank member with the shank member capable of telescoping for an appropriate distance into the head member but having a normal tendency to project therefrom to the full extent provided. Locking or retaining means on the shank member coacting with other locking or retaining means on the head member permit the setting of the shank member so that it will project from the head member to any desired extent within the range of telescoping movement of the shank member into the head member whereby the shank member may be introduced through one side of the hat body toward the other side thereof, so that the point of the pin will engage the other side of the hat member while the butt end of the shank of the pin will relatively move into the head member as the latter is brought into engagement with the corresponding portion of the body of the hat for being secured thereto, provision being made for such securing or fastening of the head member to the hat body. If, however, it be desired to have the point end of the pin shank pierce the side of the hat body remote from that to which the head end of the pin is secured, then the pin shank may be caused to project from the head member an appropriate distance, so that the point will pierce the corresponding side of the hat body, but the extent of projection of the pointed end of the pin shank is readily determined by the operator, and the pin shank may be locked against further movement of the shank through the hat body.

The invention will be best understood from a consideration of the following detailed description taken in connection with the accompanying drawings forming a part of this specification, with the understanding, however, that while in the drawings there are shown a number of practical forms of the invention, the latter is susceptible of other practical embodiments within the scope of the claims and consequently is subject to changes and modifications so long as the salient features of the invention are retained.

Figure 2:
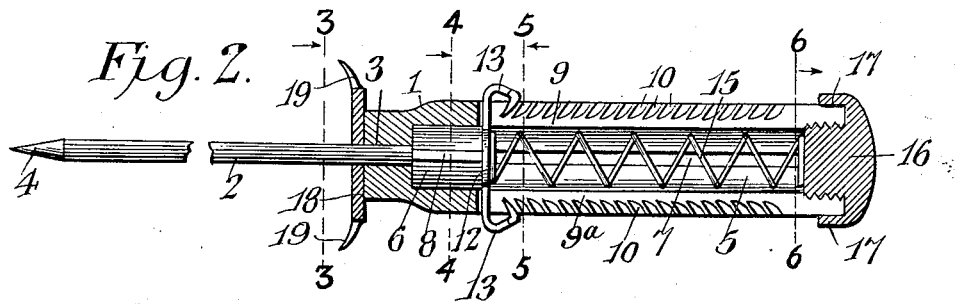
Figure 3:
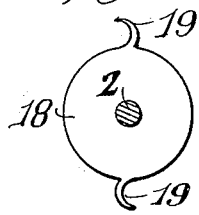
Figure 4:
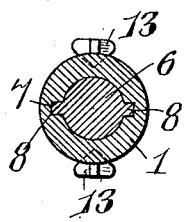
Figure 5:
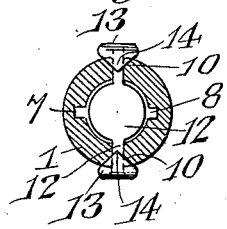
Figure 6:
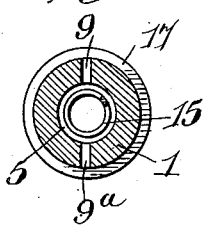
Figure 7:
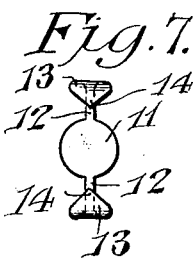
Figure 8:
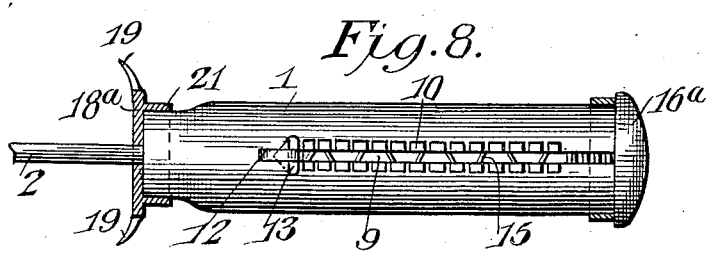
Figure 9:
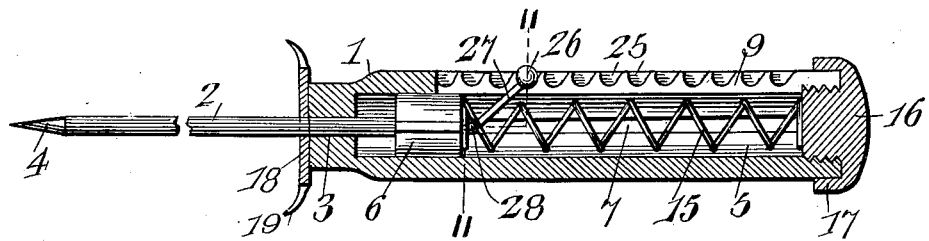
Figure 10:
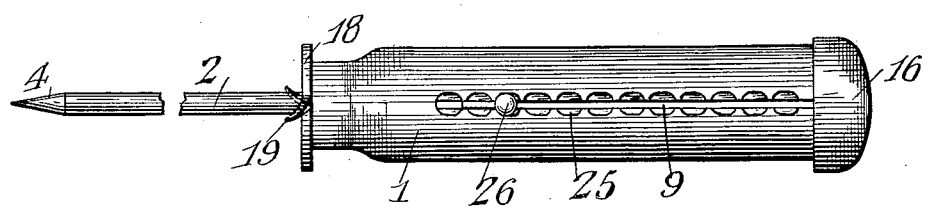
Figure 11:
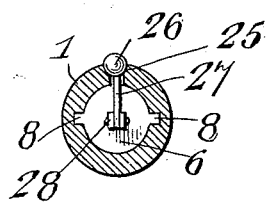
Figure 12:
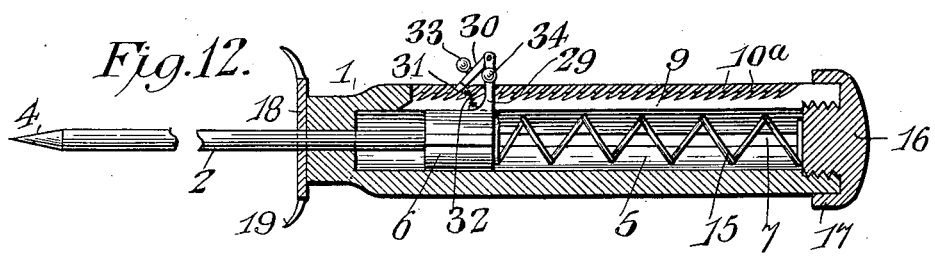

In the drawings:—Figure 1 is an elevation of one form of hat pin in position in a hat, which latter is conventionally shown and illustrated in diametric section. Fig. 2 is a longitudinal section of the head member of the hat pin shown in Fig. 1 with the shank of the pin in elevation. Fig. 3 is a section on the line 3—3 of Fig. 2. Fig. 4 is a section on the line 4—4 of Fig. 2 with some distant parts omitted. Fig. 5 is a section on the line 5—5 of Fig. 2 with distant parts omitted. Fig. 6 is a section on the line 6—6 of Fig. 2. Fig. 7 is an elevation of a latch member carried by the butt end of the pin shank. Fig. 8 is a plan view of a form of hat pin similar to Fig. 2 but of slightly modified construction. Fig. 9 is a longitudinal section of a hat pin of a somewhat different construction than illustrated in Fig. 2. Fig. 10 is a plan view of the structure shown in Fig. 9. Fig. 11 is a section on the line 11—11 of Fig. 9 with some distant parts omitted. Fig. 12 is a longitudinal section of a hat pin of a somewhat modified construction over that shown in the preceding figures. Fig. 13 is a plan view of the form of pin shown in Fig. 12. Fig. 14 is a section on the line 14—14 of Fig. 13 with distant parts omitted. Fig. 15 is a longitudinal section of a form of hat pin differing in some details from the structure shown in the preceding figures. Fig. 16 is a plan view of the structure shown in Fig. 15. Fig. 17 is a section on the line 17—17 of Fig. 16 with distant parts omitted. Fig. 18 is a perspective view of the latch member carried by the butt end of the pin shank in the structure shown in Figs. 15 and 16. Fig. 19 is a plan view of the butt end of the pin shank of the structure shown in Figs. 15 and 16. Fig. 20 is a view of a somewhat different form of latch member for use in a structure similar to that of Figs. 15 and 16.

In the drawings there is shown a pin provided with a head 1 and a shank 2, the latter entering the head through an axial perforation 3 in one end of the head and at the end remote from that entering the head the pin is provided with a point indicated at 4.

The head is provided with an internal axial bore 5 extending from the end of the head remote from the passage 3 toward but terminating short of the end of the head receiving the shank of the pin. This bore is of greater diameter than the shank of the pin, and the latter at its butt end has a block or enlargement 6 of a size to snugly yet freely fit within the bore of the head. On opposite sides the inner wall of the bore of the pin is provided with longitudinal grooves 7, and the block 6 is provided with oppositely directed splines or tongues 8 adapted to the grooves 7, so that the block 6 may move along the bore of the head of the pin without turning, being guided by the tongues 8 engaging in the grooves 7. On opposite sides of the head of the pin is a longitudinal slot 9, which, in the structure shown in Figs. 2 and 8, is duplicated on the diametrically opposite side of the head of the pin, as indicated at 9ª in the two figures referred to, and the slot 9, and when present the slot 9ª, are disposed in radial planes substantially perpendicular to the plane of the grooves 7.

In the structure shown in Figs. 2 and 8 the side walls of the slots 9 and 9ª are formed with forwardly directed notches 10 opening at the outer edge of each wall of the respective slot and terminating short of the inner edge of the slot, these notches expanding from their inner ends toward their outer ends.

Applied to the end of the block 6 remote from the pin shank 2 is a plate 11 having oppositely directed arms 12 projecting therefrom in the plane of the plate, and these arms terminate in expanded fingers 13 returned on the arms, and at the returned ends the fingers are tapered to substantially a point as indicated at 14. The disk 11, together with the arms 12 and fingers 13, may be made of some material which will bend readily without breaking, certain of the metals being capable of such manipulation. The disk 11 is of a size approximately that of the end of the block 6 remote from the shank 2 and may be soldered or otherwise secured thereto, while the arms 12 are each of a length to permit them to extend through the slots 9 and 9ª to the exterior thereof with the pointed ends 14 outside the body of the head 1. The slots 9 and 9ª open at the end of the head remote from the passage 3 and the pin with the block 6 and disk 11 and parts carried thereby may all be readily introduced through the then open end of the head. The block 6 is engaged by a spring 15 housed within the head and confined therein in engagement at one end with the plate 11, and at the other end with a screw plug 16, which may be formed with a flange 17 adapted to override the open end of the slots 9 and 9ª to form closures therefor.

At the end of the head 1 traversed by the passage 3 there is secured a plate 18 having at opposite sides projecting prongs 19, these prongs being each given a forward twist, so that when brought into engagement with a hat body, such as indicated at 20 in Fig. 1, the prongs by a rotative movement of the head 1 may be caused to enter the hat body and lock therein.

The form shown in Fig. 8 is in the main substantially the same as the form shown in Fig. 2, and, therefore, Fig 8 is in most respects a plan view of the same form that is illustrated in Fig. 2 in longitudinal section. The form shown in Fig. 8, however, differs in that the plug 16ª is in some respects slightly different in form from the plug 16 of Fig. 2 in that the flange 17 is omitted and the corresponding end of the head is surrounded by a band separate from the plug, while the plate 18ª corresponding to the plate 18 of Fig. 2 is formed with a flange 21 concentric with the longitudinal axis of the head 1, so as to receive a portion of the end thereof in which the passage 3 is formed.

When it is desired to use the hat pin, the shank 2 is pushed into the head 1 and the force used for this purpose tends to move the points 14, which in Fig. 2 are shown as lodged in the foremost recesses 10, out of said recesses, the metal of the arms 12 readily yielding to the force applied, and this metal being flexible but not elastic will hold the position to which it is moved. The pressure upon the shank 2 tending to move the shank into the head 1 is under the conditions assumed sufficient to compress the spring 15 so that the shank 2 is moved into the head 1, or the latter is moved along the shank 2, as the case may be, to the desired point, when the user may press upon the fingers 13 to force the points 14 into their recesses 10 then in their path, and the shank is thereby locked against reprojection, when the force tending to telescope the pin shank with relation to the head has been removed.

By holding the fingers 13 in the engaged position with respect to the notches 10 whereby the projection of the shank of the pin is determined, the pin may be inserted into the body of the hat 20 in the usual manner and ultimately the prongs or spurs 19 are brought into engagement with the body of the hat when a twisting movement of the head of the pin will cause the prongs to enter the body of the hat and so lock the head to the hat without further mechanism, the shape and position of the prongs being such that there is no liability of the prongs loosening and permitting the pin to likewise become loosened.

Where it is desirable that the point of the pin shall not pierce that wall of the hat remote from the wall entered by the pin shank, it is preferable to line the hat body with cork or some other like material, indicated at 22 in Fig. 1, and to hold the hat body to its normal shape against any tendency of the pressure of the pin to distort the hat body it is preferred to introduce between the lining 22 and the ordinary band 23 on the inner wall of the hat, a strip or ring 24 of metal or other stiff material.

Should it be desired to use the pin with a hat unprovided with the lining designed to receive the point of the pin, the shank of the pin may be allowed to project to a greater extent from the head than in the case first considered, and the point may then pierce the wall of the hat remote from that first entered by the pin shank, but the extent of projection is readily determined by locking the shank of the pin to the head in appropriate ones of the recesses 10 in the manner already described. When it is desired to lengthen or shorten the effective length of the pin shank a force tending to telescope the pin shank into the head will at once release the fingers 13 from engagement with the recesses 10 in the manner already described.

Instead of the locking means shown in Figs. 1 and 8 a different form of locking means such as shown in Figs. 9 and 10 may be employed. In this case the slot 9 only is provided and the outer edges of the walls of this slot are formed with sockets 25 with a socket in one wall of the slot coacting with a like socket in the opposite wall of the slot to form a pocket for the reception of a ball or knob 26 on the free end of an arm 27 hinged, as indicated at 28, to the block 6 at the butt end of the shank 2. The knob 26 readily engages in any pair of recesses or sockets 25 into which it is moved and the block 6, together with the shank 2, is locked against further movement under the action of the spring 15. The movement of the knob 26 out of the locking sockets is readily accomplished by a force acting on the shank 2 tending to compress the spring 15, and if the pin be held in a position where the knob is uppermost, the latter will drop by gravity into any pair of sockets into coincidence with which it may be moved.

In the structure shown in Figs. 12, 13 and 14 the parts of the pin are the same as in the preceding figures with the exception of the locking mechanism. In the form shown in Figs. 12 to 14 the block 6 is provided with a radial extension 29 projecting through the slot 9, while the walls of the slot are formed with recesses 10$^a$ inclined like the recesses 10 and pivoted to the free end of the extension 29 at a point beyond the outer wall of the head 1 is a pawl 30 having an expanded tooth or free end 31. This pawl is drawn toward the block 6 by a spring 32 and a knob 33 is carried by the pawl for manipulation. Furthermore, the extension 29 is provided with knobs 34 or other suitable means whereby the block may be moved from point to point along the head without the necessity of grasping the shank 2. The spring 32 tends to seat the pawl tooth 31 in appropriate pairs of notches 10$^a$ so as to lock the pin shank 2 and block 6 against the action of the spring 15.

In the structure shown in Figs. 15 to 19 and in somewhat modified form in Fig. 20 the parts of the pin agree in general with those of the other figures with the exception of the locking means. The slot 9 is provided with a series of recesses 35 in one wall only, the closed ends of these recesses being directed toward the point of the pin. The block 6 has one end formed with a groove 36 in the form of an advancing spiral, and adapted to this groove is a band 37 also in the form of an advancing spiral with the free ends overlapping, and from one side there projects an arm 38 terminating in a ball or knob 39. The arm 38 is of sufficient length to extend through the slot 9 when the band 37 has been engaged in the groove 36, and between one end of the band 37, such end being indicated at 40, and the inner termination of the groove 36, indicated at 41 in Figs. 17 and 19, there is lodged a spring 42 tending to move the band 37 in the unwinding direction with relation to the groove 36, the action of the spring 42 tending at all times to move the arm 38 into an appropriate one of the notches 35, from which notch the arm may be removed by a suitable force applied to the knob 39, said force being sufficient to compress the spring 42.

An operator grasping the knob 39 may move the band 37 in a direction to carry the arm 38 out of a notch 35 when the block 6 and the pin shank 2 may be readily moved along the head to any desired position, compressing or releasing the spring 15 in accordance with the position from which the knob is moved.

The structure shown in Fig. 20 differs from that shown in Figs. 15 to 19 only in that there is provided a band 43 in the form of an incomplete ring lodged in a partially circular groove in the block 6 with an interposed spring 44. The structure shown in Fig. 2 is in operation the same as the structure shown in Figs. 15 to 19, but usually the structure shown in Figs. 15 to 19 is to be preferred, because of ease of manufacture and assembling.

The several forms illustrated and described are deemed sufficient to show the comparatively wide range of practical embodiments of the present invention. In all the several forms the pin shank and head are in telescoping relation with the head containing a spring tending to project the pin shank to the full extent, while the butt end of the pin shank and the head have coacting locking means for holding the pin shank and head with the shank projecting to a less extent than its full extent of projection, but which locking means will readily yield to a force tending to further telescope the pin shank into the head, the telescoping movement of the pin shank being in all the forms in a right line coincident with the longitudinal axis of the head and without any twisting action.

While in Fig. 1 the cork lining 22 is shown as meeting the ring 24, it will be understood that a free space may be left between the lining and ring, so that the pin may be inserted through the wall of the hat without necessarily piercing the cork lining while the pointed end of the pin shank may be made to engage the inner wall of the cork lining on the side of the hat opposite to that where the pin shank is inserted.

What is claimed is:—

1. A hat pin comprising a head portion provided with means for attachment to a hat requiring a turning movement of the head portion about its longitudinal axis to effect such attachment, and a shank portion in telescoping relation to the head portion, said head and shank portions being provided with coacting means for preventing the turning of one relative to the other about the longitudinal axis of the hat pin, and locking means independent of said coacting means for holding the shank portion of the pin in any desired degree of projection with relation to the head of the pin.

2. A hat pin comprising a head portion provided with a longitudinal bore and with means for attachment to a hat requiring a turning movement of the head portion about its longitudinal axis, a shank portion in telescoping relation to the head portion, a block adapted to the bore in the head portion and fast to the butt end of the shank portion of the pin, coacting means on the block and in the head portion of the pin for maintaining the shank of the pin against turning about the longitudinal axis of the head-portion, coacting locking means on the block and the head portion of the pin for holding the pin shank in any desired degree of telescoping relation with respect to the head of the pin, and means within the head portion tending to project the shank portion to its full extent and also to hold the coacting locking means in locked position.

3. A hat pin comprising a head portion having a longitudinal bore and a longitudinal slot entering the bore, said head portion being provided at one end with means constructed to require a turning movement of the head portion about its longitudinal axis to lock it to a hat body and at the other end with a closure for the bore and slot, a pin shank entering the end of the head portion provided with hat engaging means and having at the butt end within the bore a block of a size to fit the bore and move therealong, the block being provided with tongues and the interior of the head with corresponding grooves receiving the tongues, a spring within the bore engaging the block and tending to project the shank of the pin, and a lock member carried by the block and projecting through the slot in the head portion and there accessible for manipulation, the slot in the head portion having recesses adapted to engage the lock member carried by the block and the spring having a normal tendency to hold the lock member on the block in engagement with a recess in the slot in the head portion.

4. A hat pin comprising a head member and a shank member in telescoping relation to the head member, the latter being provided with a longitudinal slot having marginal recesses directed toward the end of the head member through which the shank member projects, and a locking member carried by the shank member and movable about the longitudinal axis of the shank member into and out of the marginal recesses along the slot in the head member.

5. A hat pin comprising a head member and a shank member in telescoping relation to the head member, the latter being provided with a longitudinal slot having marginal recesses directed toward the end of the head member through which the shank member projects, a spring within the head member tending constantly to project the shank member, and a lock member carried by the shank member and movable independently thereof about the longitudinal axis of the shank member into and out of engaging relation with the marginal recesses in the head member.

6. A hat pin comprising a head member and a shank member in telescoping relation to the head member, the shank member being provided with an enlargement within the head member, and said head and shank members being provided with coacting means for preventing turning of either with relation to the other, a spring within the head member tending constantly to project the shank member, and a locking member carried by the enlargement of the shank member and movable independently of the shank member about the longitudinal axis of the latter, the head member being provided with a longitudinal slot through which the locking member of the shank member projects and with marginal recesses directed toward the end of the head member through which the shank member projects, said locking member being movable into and out of chosen ones of the recesses to limit the projection of the shank member from the head of the pin.

7. A hat pin comprising a head member and a shank member in telescoping relation one to the other, the head member being provided with a longitudinal slot having marginal recesses directed toward the end of the head member through which the shank member projects, and said shank and head members having within the latter coacting means for preventing turning of either member with relation to the other, a locking means carried by the shank member and moving about the longitudinal axis of the latter into and out of chosen ones of the recesses in the head member, and said head member being provided with means for engaging a hat body to lock the said head member thereto.

8. A hat pin comprising a head member provided with a longitudinal slot having marginal recesses directed toward one end of the head member, a shank member in telescoping relation to the head member and entering the end of the head member toward which the marginal recesses are directed, said shank member being provided with a helical groove, and the head member containing a spring tending normally to project the shank member, and a locking member comprising a pin provided at one end with a helix adapted to the helical groove in the shank member, said locking member being movable into and out of engagement with the recesses in the head member in a direction about the longitudinal axis of the shank member independently of the latter.

9. A hat pin comprising a head member provided with a longitudinal slot having marginal recesses directed toward one end of the head member, a shank member in telescoping relation to the head member and entering the end of the head member toward which the marginal recesses are directed, said shank member being provided with a helical groove, and the head member containing a spring tending normally to project the shank member, and a locking member comprising a pin provided at one end with a helix adapted to the helical groove in the shank member, said locking member being movable into and out of engagement with the recesses in the head member in a direction about the longitudinal axis of the shank member independently of the latter, the shank member also carrying a spring in position to act on the locking member to move it normally into locking engagement with a marginal recess in the head member.

In testimony, that I claim the foregoing as my own, I have hereto affixed my signature in the presence of two witnesses.

ALEXANDER B. KOKERNOT.

Witnesses:
EDWARD J. THILBERGER,
H. W. CRAWFORD.

---

Copies of this patent may be obtained for five cents each, by addressing the "Commissioner of Patents, Washington, D. C."